United States Patent [19]

Gompper

[11] Patent Number: 4,824,607
[45] Date of Patent: Apr. 25, 1989

[54] PROCESS FOR DENITRATING AQUEOUS, NITRIC ACID AND SALT CONTAINING WASTE SOLUTIONS

[75] Inventor: Klaus Gompper, Karlsruhe, Fed. Rep. of Germany

[73] Assignee: Kernforschungszentrum Karlsruhe GmbH, Fed. Rep. of Germany

[21] Appl. No.: 552,797

[22] Filed: Nov. 17, 1983

[30] Foreign Application Priority Data

Nov. 26, 1982 [DE] Fed. Rep. of Germany ....... 3243840

[51] Int. Cl.$^4$ ............................ G21F 9/08; C02F 1/70
[52] U.S. Cl. ...................................... 252/631; 210/757
[58] Field of Search ......................... 252/631; 210/757

[56] References Cited

U.S. PATENT DOCUMENTS

| | | | |
|---|---|---|---|
| 3,158,577 | 11/1964 | Bray et al. ........................... | 252/631 |
| 3,673,086 | 6/1972 | Drobnik ............................. | 252/631 |
| 3,725,293 | 4/1973 | Haas .................................. | 252/642 X |
| 3,803,295 | 4/1974 | Cathers et al. .................... | 252/631 X |
| 4,225,455 | 9/1980 | Haas .................................. | 252/631 |

FOREIGN PATENT DOCUMENTS 2125915  6/1980  Fed. Rep. of Germany .

OTHER PUBLICATIONS

Forsman et al, "Formaldehyde Treatment of Purex Radioactive Wastes", AEC Research and Development Report, Oct. 1963, HW-79622, pp. 1-33.
Richter et al, "Serstörung des Salpetersäureübersh-cusses in Radioaktiven Abfallösungen und Verfestingung des Rückstandes als Alkydharz", Austrian Study Group for Atomic Energy, Mar. 1974, pp. 1-14.
The Condensed Chemical Dictionary, 10th Edition, Van Nostrand Reinhold Co., N.Y., 1981, p. 729.

Primary Examiner—John F. Terapane
Assistant Examiner—Virginia B. Caress
Attorney, Agent, or Firm—Sughrue, Mion, Zinn, Macpeak & Seas

[57] ABSTRACT

A process for denitrating aqueous, nitric acid and salt containing waste solutions, comprises mixing the waste solution at room temperature with ethyl alcohol, and heating the mixture to at least 75° C.

11 Claims, No Drawings

PROCESS FOR DENITRATING AQUEOUS, NITRIC ACID AND SALT CONTAINING WASTE SOLUTIONS

BACKGROUND OF THE INVENTION

The present invention relates to a process for denitrating aqueous nitric acid and salt containing waste solutions.

In reprocessing irradiated and spent fuel and/or breeder elements there result aqueous, radioactive waste solutions which carry along a number of salts. Inter alia, these solutions contain actinide salts which must be removed from these solutions before further treatment of the waste solutions is effected, for example for the purpose of solidifying the radioactive fission nuclides. This removal of actinide salts could be done, for example, by precipitation with oxalic acid, if the solubility product of the actinide oxalates, e.g. plutonium oxalate, can be exceeded. However, this is possible only if the nitric acid, which is present in high concentration, is destroyed practically completely.

In the past, a series of denitration processes have been proposed to dispose of highly radioactive waste solutions. A few of these processes will be listed here:

R. C. Forsman and G. C. Oberg describe, in a US-AEC report from the Hanford Works, HW-79622, October 1963, entitled "Formaldehyde Treatment of Purex Radioactive Waste," a denitration with formaldehyde.

S. Drobnik destroys nitric acid with formic acid, as described in German Pat. No. 1,935,273 and corresponding U.S. Pat. No. 3,673,086.

L. A. Bray and E. C. Martin disclose denitration with sugar in U.S. Pat. No. 3,158,577.

W. Boccola and A. Donato denitrate with phosphorus, as disclosed in German Pat. No. 2,125,915.

H. Richter and H. Sorantin describe, in a report of the Austrian Studiengesellschaft fur Atomenergie GmbH (in translation, Study Group for Atomic Energy) (Seibersdorf) SGAE Report No. 2252 ST 23/74, March 1974, the destruction of excess nitric acid in radioactive waste solutions with the aid of glycerin and the subsequent solidification of the residue as alkyd resin.

The above-listed processes have the following drawbacks:

In denitration with formaldehyde or formic acid, the nitric acid solution and denitration reagent cannot be mixed before the reaction since otherwise the denitration reaction would be too violent during heating. The denitration reagent must be added in measured quantities during the reaction. Separation of excess reagent is fraught with problems.

In denitration with sugar, the sugar is added as an aqueous solution, and this adds to the volume of the waste solution.

In denitration with phosphorus, the nonvolatile phosphoric acids are formed, inter alia, which remain in the denitrated solution.

In denitration with glycerin, the reaction exhibits an induction period as a function of temperature. Here again, the denitration reagent is added in measured quantities during the reaction.

SUMMARY OF THE INVENTION

It is an object of the present invention to substantially reduce the acid and nitrate content of nitric acid waste solutions.

Another object of the present invention is to provide such a process which reduces the total salt content in the waste solution without incurring the danger of violent reactions or an increase in volume of the waste solution.

A further object of the present invention is to facilitate the precipitation step following the denitration in which, for example, actinides or other dissolved substances are removed.

Additional objects and advantages of the present invention will be set forth in part in the description which follows and in part will be obvious from the description or can be learned by practice of the invention. The objects and advantages are achieved by means of the processes, instrumentalities and combinations particularly pointed out in the appended claims.

To achieve the foregoing objects and in accordance with it purpose, the present invention provides a process for denitrating aqueous nitric acid and salt containing solutions, comprising mixing the waste solution at room temperature with ethyl alcohol, and heating the mixture to at least 75° C.

It is to be understood that both the foregoing general description and the following detailed description are exemplary and explanatory, but are not restrictive of the invention.

DETAILED DESCRIPTION OF THE INVENTION

The practice of the present invention provides numerous advantages. Thus, in the present invention, the nitric acid containing waste solution and the denitration reagent can be mixed together already at room temperature. The denitration reaction begins at about 75° to 90° C. A certain induction period for the desired reaction, such as occurs in the denitration with glycerin, does not occur in the process according to the present invention. Excess ethyl alcohol from the denitration reagent can be removed from the reaction solution by simple distillation so that subsequent decomposition of a residual quantity, as in the case of formic acid or formaldehyde, with hydrogen peroxide is no longer necessary as for example in other denitration processes to destroy an excess of reagent (e.g. formic acid). An additional increase in th the waste solution, as in the case of the addition of sugar, is also avoided.

It has been found that a mole ratio of 0.5 to 1.5 ethyl alcohol to 1.0 nitric acid is sufficient for substantial denitration, preferred 0.5 to 1.0 ethyl alcohol to 1.0 nitric acid.

Suitable ranges for the time of heating are 1 to 4 hours and for the heating temperature are 75° to 100° C. The concentration of nitric acid in the starting solution can be between 0.5 and 5 moles/l or more. The percentage of nitric acid which can be decomposed arises up to ca. 98%.

The aqueous waste solutions which are treated can be, for example, a radioactive waste solution containing nitric acid, actinides, fission products and inactive compounds in different concentrations and inactive solutions containing nitric acid and other compounds in different concentrations.

The present invention will now be described in greater detail with the aid of the following example which is given by way of illustration to further explain the principles of the invention. This example is merely illustrative and is not to be understood as limiting the scope and underlying principles of the invention in any way. All percentages referred to herein are by weight unless otherwise indicated.

EXAMPLE

A round bottom flask with an attached cooler, magnetic stirrer, thermometer and mushroom-shaped heater, was employed to denitrate an aqueous nitric acid and salt containing solution. In a first test, the cooler was a Liebig cooler and in a second test, the cooler was a reflux condenser.

In each test, a simulated, nitric acid containing waste solution was mixed at room temperature with ethanol (mole ratio $HNO_3/C_2H_5OH = 1$). Then the mixture was heated while being stirred. At approximately 75° to 80° C., gas began to develop and the mixture began to boil. The reaction solution was heated to about 95° to 100° C. and maintained at that temperature.

After cooling, the residual acid concentration was determined by titration with sodium hydroxide solution. The composition of the simulated waste solution employed in both tests was as follows:

| | | |
|---|---|---|
| $HNO_3$: | 1 mol/l | |
| Na: | 81 g/l | |
| Al, Ca, Cr, Cu, Fe, K, Mg, Mn, Mo, Ni, Ru, Zn, Cs, Sr: | 24 g/l | (total) |
| nitrate: | 251 g/l | |

The metals were used in the form of their nitrate salts.

The results of the two tests are as follows:
(a) Cooler: Liebig
Denitration reagent: ethanol
Starting solution: 200 ml simulated waste solution

| Time [min] | 90 | 180 | 240 |
|---|---|---|---|
| % of orig. existing $HNO_3$ decomposed | 73 | 75.5 | 78 |

(b) Cooler: Reflux condenser
Denitration reagent: ethanol
Starting solution: 200 ml simulated waste solution

| Time [min] | 90 | 180 | 240 |
|---|---|---|---|
| % of orig. | 94.5 | 95.5 | 95.5 |

It will be understood that the above description of the present invention is susceptible to various modifications, changes and adaptations, and the same are intended to be comprehended within the meaning and range of equivalents of the appended claims.

What is claimed is:

1. A process for denitrating dilute aqueous nitric acid and nitrate salt containing waste solutions, comprising mixing the waste solution with ethyl alcohol at room temperature, and heating the mixture to at least 75° C. and up to 100° C. at normal pressure.

2. A process according to claim 1, wherein the mixture is heated to a temperature of about 95° to 100° C.

3. A process according to claim 1, wherein the waste solution is an actinide containing waste solution.

4. A process according to claim 1, wherein the mixture is heated for about 1.0 to 4 hours.

5. A process according to claim 1, wherein the ethyl alcohol is mixed with the waste solution at a mole ratio of 0.5 to 1.5 ethyl alcohol to 1.0 nitric acid.

6. A process according to claim 5, wherein the mixture is heated to a temperature of about 95° to 100° C. for about 1.0 to 4 hours.

7. Process according to claim 1, wherein the process is continued for a sufficient length of time to decompose at least 73% of the originally existing $HNO_3$.

8. Process according to claim 1, wherein the process is continued for a sufficient length of time to decompose at least 94.5% of the originally existing $HNO_3$.

9. Process according to claim 1, wherein the process is continued for a sufficient length of time to decompose from 73 to 98% of the originally existing $HNO_3$.

10. Process according to claim 1, wherein a mole ratio of 0.5 to 1.0 moles ethyl alcohol to 1 mole nitric acid is employed.

11. Process according to claim 1, wherein the concentration of nitric acid in the starting waste solutions is between 0.5 and 5 moles per liter of waste.

* * * * *